(No Model.)
R. T. PETTEBONE.
VEGETABLE AND PLANT CUTTER AND HARVESTER.
No. 249,665. Patented Nov. 15, 1881.
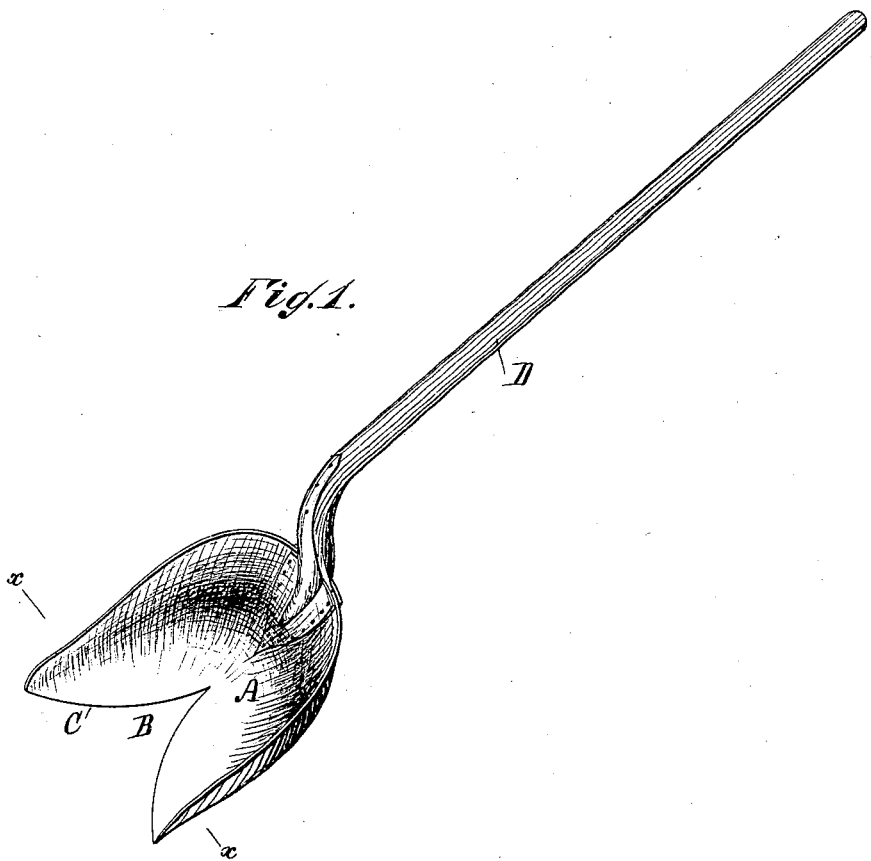
Fig. 1.
Fig. 2.
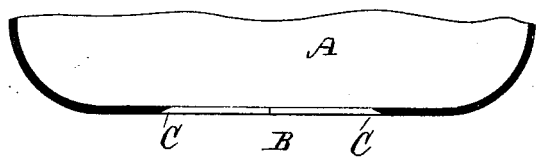
WITNESSES:
Theo. G. Hoster
C. Sedgwick
INVENTOR:
R. T. Pettebone
BY Munn & Co.
ATTORNEYS.

UNITED STATES PATENT OFFICE.

ROBERT T. PETTEBONE, OF WYOMING, PENNSYLVANIA.

VEGETABLE AND PLANT CUTTER AND HARVESTER.

SPECIFICATION forming part of Letters Patent No. 249,665, dated November 15, 1881.

Application filed August 26, 1881. (No model.)

*To all whom it may concern:*

Be it known that I, ROBERT T. PETTEBONE, of Wyoming, in the county of Luzerne and State of Pennsylvania, have invented a new and Improved Vegetable and Plant Cutter and Harvester, of which the following is a specification.

The invention consists of a bowl or scoop adapted to contain the head of a plant when cut, which scoop is provided in front with a V-shaped recess having cutting edges to sever the stem of the plant and cause the latter to fall in the bowl. The bowl has a handle at rear.

Reference is to be had to the accompanying drawings, forming part of this specification, in which similar letters of reference indicate corresponding parts in all the figures.

Figure 1 is a perspective view of my improved vegetable and plant cutter and harvester. Fig. 2 is a cross-sectional elevation of the same on the line $x\,x$, Fig. 1.

The scoop or bowl A, which may be made of wood or metal, either solid, slotted, or perforated, is provided in its front end with a V-shaped recess, B, provided with cutting-edges C, and at its rear end this scoop is provided with a suitable handle, D.

The cutting-edges of the V-shaped recess may be riveted or otherwise attached to the edges of the recess; or the edges of the recess may be beveled and hardened to form cutting-edges, as shown in Fig. 2, this latter construction being preferred.

In harvesting plants—for instance, such as cabbage, cauliflowers, pumpkins, squashes, &c.—the scoop A is passed under the head of the plant, and as the cutting-edges of the V-shaped recess strike the stem of the plant they sever it, thus separating the head from the stem, which head falls in the bowl or scoop A, and can be thrown into the wagon or other suitable receptacle very conveniently by means of the handle D. Plants can thus be cut and harvested much more rapidly and with less labor than heretofore. The person harvesting the plants need not bend, and can operate much more rapidly than if harvesting in the ordinary manner.

Having thus fully described my invention, I claim as new and desire to secure by Letters Patent—

1. A plant-cutter consisting of the bowl A, having sharpened edges C in a front recess, B, and a rear handle, D, arranged at an oblique angle to the bowl, as described.

2. In an implement for cutting plants, the bowl or scoop A, constructed with a V-shaped recess and cutting-edges C, substantially as shown and described.

ROBERT TREAT PETTEBONE.

Witnesses:
R. E. HUTCHINS,
A. T. HEISER.